(No Model.)
S. H. EVERETT.
FERTILIZER DISTRIBUTER.
No. 479,637. Patented July 26, 1892.
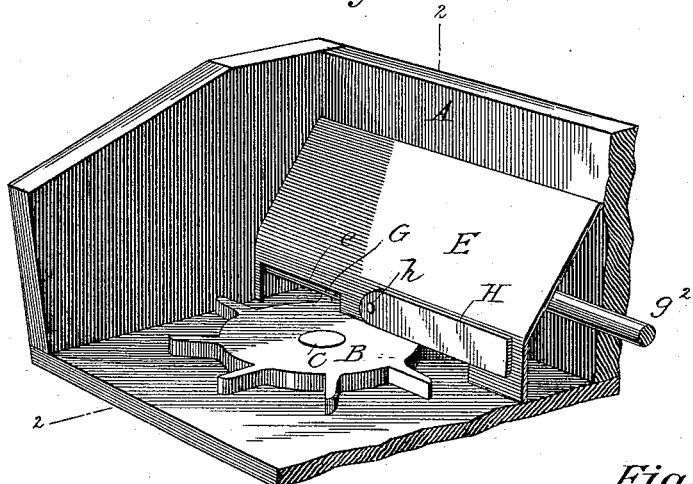
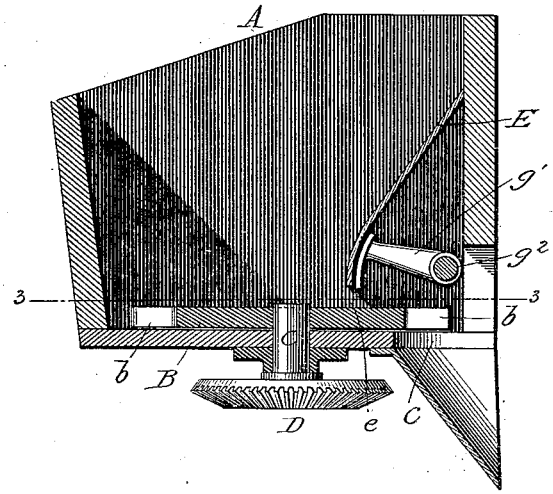
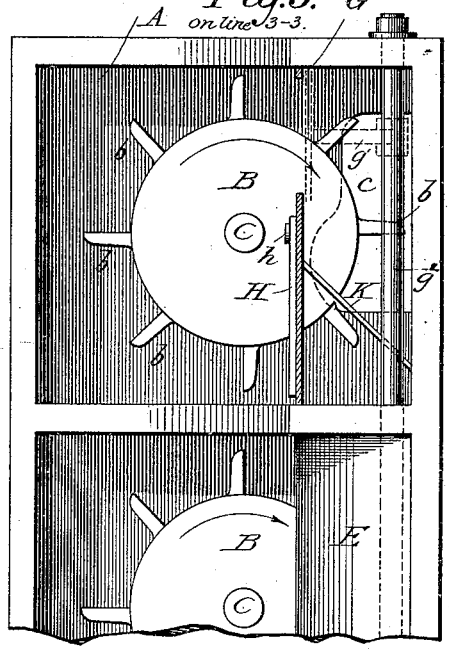

UNITED STATES PATENT OFFICE.

SAMUEL H. EVERETT, OF MACEDON, NEW YORK.

FERTILIZER-DISTRIBUTER.

SPECIFICATION forming part of Letters Patent No. 479,637, dated July 26, 1892.

Application filed February 11, 1892. Serial No. 421,171. (No model.)

*To all whom it may concern:*

Be it known that I, SAMUEL H. EVERETT, of Macedon, county of Wayne, and State of New York have invented a new and useful Improvement in Fertilizer-Distributers, of which the following is a specification.

This invention has reference to that type of fertilizer-distributer represented in Letters Patent of the United States No. 237,843, granted to me on the 15th day of February, 1881, wherein a horizontally-revolving disk lying in the bottom of a hopper is provided with radial projecting teeth, which deliver the material through an aperture in a side wall and over a discharge tube or orifice, through which it falls.

In carrying the present invention into effect I employ in connection with the feed-wheel a hopper or plate, forming the side of the hopper, so constructed as to afford a delivery-opening not only at the point where the radial teeth of the wheel sweep the material therethrough, but also an opening upon or over the outer edge of the body of the wheel—that is to say, upon its upper surface—so that the feeding of the material is effected by the teeth and by the upper surface of the wheel acting conjointly. The two streams or the composite stream resulting from this double delivery is found to issue under all conditions with substantial uniformity, and it is found that the material flowing outward on top of the wheel acts to drive downward and to insure the delivery of the material, which is carried out between the fingers. I also use in connection with the above improvements gates or valves arranged in a simple manner to control the rate of discharge. I also propose to provide a gate or valve by which the delivery-opening over the surface of the wheel may be closed, so as to compel the delivery for the time being at the periphery alone. The last-named features are, however, of minor importance.

In the accompanying drawings, Figure 1 is a perspective view, partly in section, of one of my feed devices located in a hopper. Fig. 2 is a vertical cross-section of the same on the line 2 2. Fig. 3 is a horizontal section on the line 3 3, looking in a downward direction.

Referring to the drawings, A represents the stationary box or hopper, having a horizontal bottom plate.

B is a horizontally-revolving feed-wheel lying upon or closely adjacent to the bottom of the hopper and driven by a shaft or spindle C, extending downward through the bottom and provided with a gear-wheel D on the lower end, as usual in this class of distributers. The wheel is constructed with a flat or approximately flat upper surface and with a series of peripheral radial teeth $b$ to sweep the material horizontally outward over a delivery-opening $c$ in one side of the hopper-bottom, so that it may fall therethrough.

E is a plate or wall overlying one side of the wheel between the interior of the hopper and the discharge-opening $c$. This plate serves to prevent the mass of material in the hopper from flowing directly to the outlet-opening. The teeth of the wheel sweep through or past the lower edge of this plate, carrying the material thereunder to the point of discharge, as usual. Heretofore the plate has usually fitted closely across the top of the wheel, having beneath it only a space for the passage of the teeth. There was no opportunity for the material to flow outward on top of the wheel, its delivery being confined entirely to the space between the teeth of the wheel. In the improved device I enlarge the opening or passage in the plate E, through which the material escapes from the hopper, as shown at $e$, Fig. 1, so as to expose a portion of the upper surface of the wheel near its outer edge, and thus allow the material to flow outward with the wheel not only between its teeth, as heretofore, but also to a limited extent on its upper surface and above the level of the teeth. It will be perceived that I have thus, in effect, a double delivery—that is to say, a delivery by and between the teeth of the wheel and also a delivery on top of the wheel and above the teeth. The material lying above the teeth and moving forward with the wheel until it is over the discharge-opening $c$ there acts by gravity to drag the material from between the teeth downward and outward, and, following thereafter, it also falls between the teeth and thence through the discharge-opening $c$. In practice it is found that by means of this double feed I am able to secure a freedom and uniformity of delivery of the adhesive and pasty phosphates, which I have been unable to secure with like certainty in any other manner.

In order to regulate the rate of delivery, I propose to employ behind a plate E a vertically-movable gate to change the vertical width of or close the opening above the wheel. I prefer to hang this gate, as shown at G in the drawings, on an arm $g'$, reaching out from a horizontal rock-shaft $g^2$, which will extend beneath the plate E throughout the length of the machine, so as to carry the gates for the entire series of distributers. Turning this shaft by means of a suitable handle or other device at one end, the entire series of gates may be swung upward and downward at will, so as to vary the openings. I may also provide as a means of entirely closing the upper openings, when required, reversible cut-off blades H. These will be arranged one above each wheel and connected by a pivot $h$ to the plate E, so that it may be turned backward out of action, as shown by full lines in Fig. 1, or turned over so as to completely close that part of the outlet-opening which lies above the level of the wheel.

In the use of the present class of distributers the delivery-opening $c$ has usually been made of comparatively small size and located well within the margin of the bottom plate of the hopper, so that at times there was a tendency of the material to accumulate therein, and so also that it was necessary to use an inclined conductor to direct the material to the desired point. I locate the feed-wheel so that its teeth extend backward nearly to the inner or rear edge of the bottom plate and make the delivery-opening of large size, extending the same to the rear edge of the plate, as shown in the several figures. This permits a free discharge of the material and permits it to be directed downward by a simple inclined plane.

As shown in Fig. 3, I prefer to make the delivery-opening of comparatively narrow width at the point where the teeth first pass over it and to widen it toward the opposite end, as shown, until it finally extends beneath the edge of the wheel, as indicated in dotted lines, this arrangement giving a freer discharge and preventing the choking of the machine.

In order to insure the discharge of the material passing backward on the upper surface of the wheel, I attach to the rear side of the plate E or to any suitable support an arm or blade K, extending rearward in an oblique direction, its effect being to scrape the material from the top of the wheel and direct the same downward toward the delivery. This arm may be in any suitable form and under some circumstances may be omitted.

Having thus described my invention, what I claim is—

1. In combination with the hopper, the peripherally-toothed wheel, the wall or plate E, having an opening through which the wheel works, and the rock-shaft provided with the vertically-movable gate parallel to the said wall or plate to control the size of the opening through which the wheel works.

2. In combination with the hopper, the peripherally-toothed wheel, the wall or plate E, having an opening through which the wheel works, the rock-shaft, and the vertically-movable gate above the wheel and parallel to the said wall to control the size of the opening through which the wheel works.

3. In combination with the hopper, the wheel B and the plate E, having an opening over the surface of the wheel, and a reversible cut-off gate H to close the opening above the wheel.

4. In a fertilizer-distributer of the type herein shown, the feed-wheel having peripheral teeth and an overlying plate E, in combination with a hopper having in rear of the plate an outlet-opening $c$, enlarged from one end toward the other.

5. In combination with the feed-wheel having peripheral teeth and an overlying wall or plate E, beneath which the wheel delivers the material, a bottom plate having a discharge-opening $c$, over which the teeth sweep and which is widened at one end to extend beneath the body of the wheel.

In testimony whereof I hereunto set my hand, this 5th day of January, 1892, in the presence of two attesting witnesses.

SAMUEL H. EVERETT.

Witnesses:
G. W. KIRKPATRICK,
G. B. ANTHONY.